US011482949B2

(12) United States Patent
Wilson et al.

(10) Patent No.: US 11,482,949 B2
(45) Date of Patent: Oct. 25, 2022

(54) ELECTROSTATIC HARVESTER DEVICE

(71) Applicant: HONEYWELL FEDERAL MANUFACTURING & TECHNOLOGIES, LLC, Kansas City, MO (US)

(72) Inventors: Amy Charlene Wilson, Kansas City, MO (US); William Daniel Hunt, Atlanta, GA (US)

(73) Assignee: HONEYWELL FEDERAL MANUFACTURINGS TECHNOLOGIES, LLC, Kansas City, MO (US)

( * ) Notice: Subject to any disclaimer, the term of this patent is extended or adjusted under 35 U.S.C. 154(b) by 109 days.

(21) Appl. No.: 16/701,882

(22) Filed: Dec. 3, 2019

(65) Prior Publication Data

US 2020/0177106 A1 Jun. 4, 2020

Related U.S. Application Data

(60) Provisional application No. 62/774,403, filed on Dec. 3, 2018.

(51) Int. Cl.
*H02N 1/08* (2006.01)
(52) U.S. Cl.
CPC ..................... *H02N 1/08* (2013.01)
(58) Field of Classification Search
CPC ......... H02N 1/08; H02M 3/335; H02J 50/001
USPC .................... 310/308–309; 318/116; 322/2 R
See application file for complete search history.

(56) References Cited

U.S. PATENT DOCUMENTS

| 6,168,659 B1 * | 1/2001 | Yuri ............... H01L 21/02381 117/89 |
| 6,373,318 B1 * | 4/2002 | Dohnke ............ H01L 27/085 257/E27.059 |
| 7,105,982 B1 * | 9/2006 | Hagood, IV ........ H02N 2/181 310/319 |

(Continued)

FOREIGN PATENT DOCUMENTS

DE 102015119969 A1 * 5/2017 ............... H02N 1/08

OTHER PUBLICATIONS

K.Peterson et al. "High-damping energy-harvesting electrostatic CMOS charger", 2012 IEEE International Symposium on Circuits and Systems (ISCAS), 2012, Conference Paper, pp. 676-679. (Year: 2012).*

(Continued)

*Primary Examiner* — Burton S Mullins
(74) *Attorney, Agent, or Firm* — Hovey Williams LLP

(57) ABSTRACT

An electrostatic harvester device for charging an energy storage device is provided. The electrostatic harvester device comprises an inductor, a variable capacitor device, a semiconductor device, and a plurality of transistors. The inductor is operable to receive electric charge and store the electric charge. The variable capacitor device is configured to receive electric charge from the inductor and to change capacitance in response to physical stimulation. The semiconductor device is operable to allow electric current to flow from the variable capacitor device. The transistors are operable to connect at least two of the aforementioned devices. At least one of the transistors comprises at least one of gallium nitride or aluminum gallium nitride.

10 Claims, 2 Drawing Sheets

(56) References Cited

U.S. PATENT DOCUMENTS

| | | | | |
|---|---|---|---|---|
| 7,977,852 | B2* | 7/2011 | Ward | H02N 2/181 |
| | | | | 310/339 |
| 9,160,223 | B2* | 10/2015 | Membretti | H03K 17/063 |
| 9,450,434 | B2* | 9/2016 | Bottarel | H02J 7/32 |
| 9,461,504 | B2* | 10/2016 | Ramorini | H02M 7/04 |
| 9,647,578 | B2* | 5/2017 | Delamare | H01H 59/00 |
| 10,038,441 | B2* | 7/2018 | Jardel | H03K 17/04106 |
| 10,312,797 | B1* | 6/2019 | Phipps | H02M 3/158 |
| 2012/0187897 | A1* | 7/2012 | Lenk | H01M 10/46 |
| | | | | 320/101 |
| 2018/0166901 | A1* | 6/2018 | Yu | H02J 7/35 |

OTHER PUBLICATIONS

R.Chu et al. "An Experimental Demonstration of GaN CMOS Technology", IEEE Electron Device Letters, vol. 37, No. 3, Mar. 2016, pp. 269-271 (Year: 2016).*

* cited by examiner

ELECTROSTATIC HARVESTER DEVICE

RELATED APPLICATIONS

The present non-provisional patent application claims priority of U.S. Provisional Patent Application Ser. No. 62/774,403 filed on Dec. 3, 2018, and entitled "GALLIUM NITRIDE ELECTROSTATIC ENERGY HARVESTER/CHARGER," which is hereby incorporated herein in its entirety by reference.

STATEMENT REGARDING FEDERALLY-SPONSORED RESEARCH OR DEVELOPMENT

This invention was made with Government support under Contract No.: DE-NA-0002839 awarded by the United States Department of Energy/National Nuclear Security Administration. The Government has certain rights in the invention.

BACKGROUND

Electrostatic harvester devices convert kinetic energy into electrical signals. The devices may include a variable capacitor that changes capacitance in response to physical stimulation, such as through physical separation of its conductive plates. A voltage may be applied to the variable capacitor and held constant so that when the capacitance decreases, instead of the voltage of the capacitor increasing, electrical charge flows out of the variable capacitor. The electrical energy generated from this process may be transferred to an energy storage device, thereby converting the kinetic energy into an electrical signal.

Electrostatic harvester devices are often placed in remote locations to generate electrical power for batteries or power systems that provide power to other remote electronic devices. The electrostatic harvester devices are subject to jarring movement and vast temperature changes. Such electrostatic harvester devices use transistors for operation, which often underperform and/or fail due to insufficient conversion of kinetic energy of the vibrations or due to the temperature changes.

The background discussion is intended to provide information related to the present invention which is not necessarily prior art.

SUMMARY

The present invention solves the above-described problems and other problems and provides a distinct advance in the art of electrostatic harvester devices. More particularly, the present invention provides an electrostatic harvester device that is more robust and provides increased kinetic energy conversion.

An electrostatic harvester device for charging an energy storage device constructed in accordance with embodiments of the present invention broadly includes an inductor, a variable capacitor device, a semiconductor device, and a plurality of transistors. The inductor is operable to receive and store electric charge. The variable capacitor device is configured to receive electric charge from the inductor and to change capacitance in response to physical stimulation. The semiconductor device is operable to allow electric current to flow from the variable capacitor device.

The transistors are operable to connect at least two of the following devices: the energy storage device, the inductor, or the variable capacitor device. At least one of the transistors comprises at least one of gallium nitride or aluminum gallium nitride. The gallium nitride or aluminum gallium nitride transistor has a wider bandgap which leads to better temperature stability. The gallium nitride or aluminum gallium nitride transistor also has a higher breakdown voltage. The higher breakdown voltages allow a higher voltage to be applied to the variable capacitor to convert more kinetic energy into electric energy. It also reduces a frequency of partial electrical discharge of the device.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
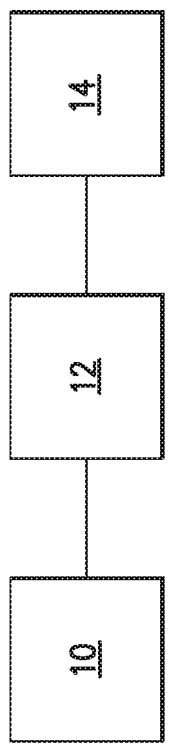
FIG. 1 is a schematic view of a device implementing an electrostatic harvester constructed in accordance with embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
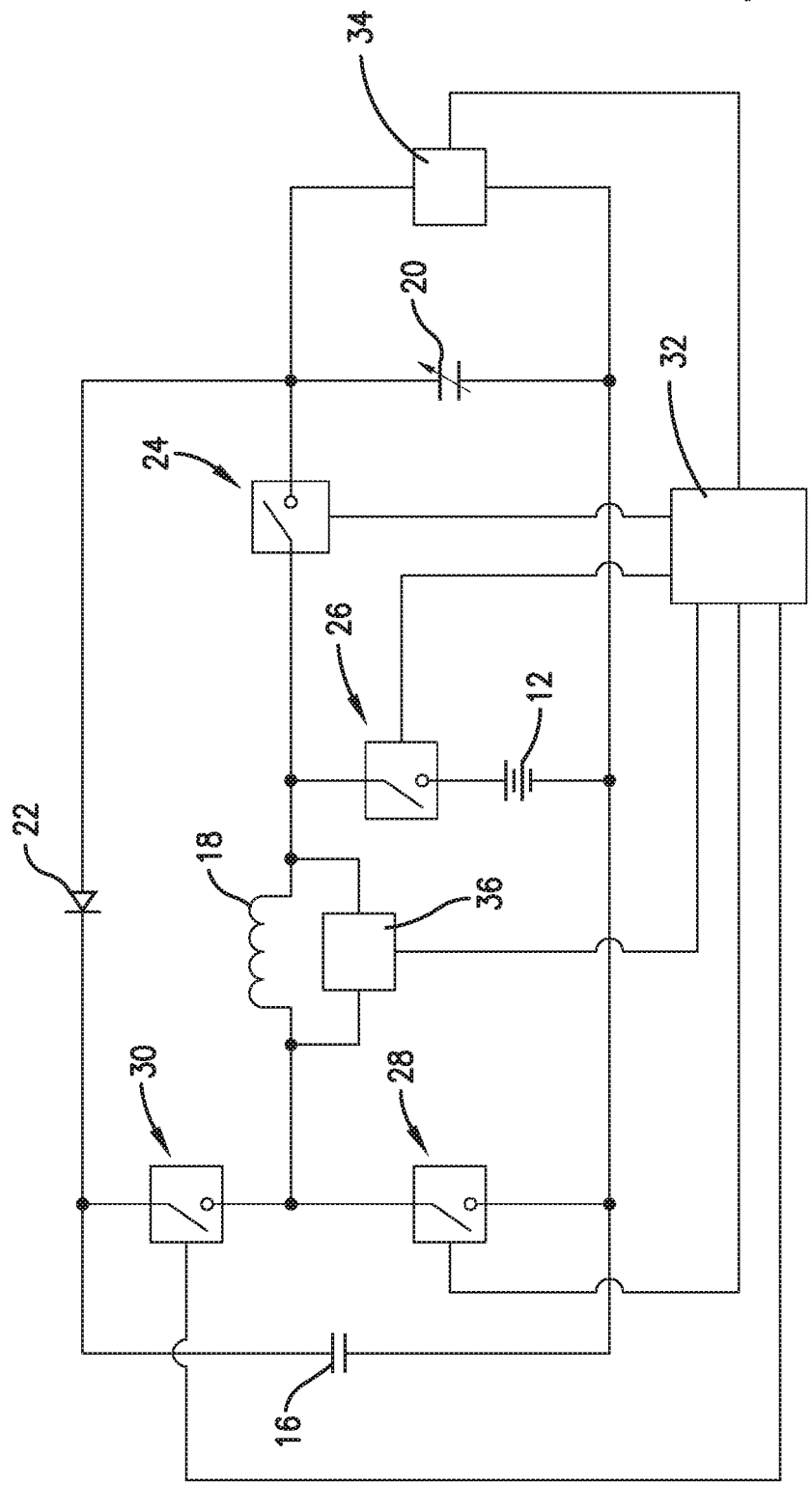
FIG. 2 is a circuit diagram of the electrostatic harvester of FIG. 1.

Turning to FIG. 1, an electrostatic harvester device 10 constructed in accordance with an embodiment of the present invention is illustrated. The electrostatic harvester device 10 may be electrically connected to an energy storage device 12 that powers a primary device 14, such as a sensor, communication system, or the like. The electrostatic harvester device 10 broadly comprises an inductor 18, a variable capacitor 20, a semiconductor device 22, a plurality of gallium nitride and/or aluminum gallium nitride transistors 24, 26, 28, 30, a clamping device 16, a controller 32, a capacitance detector 34, and a current detector 36, as shown in FIG. 2.

The inductor 18 is operable to receive and store electric charge. For example, the inductor 18 may be configured to receive electric charge from the clamping device 16, temporarily store the charge, and discharge at least some of the charge into the variable capacitor 20 or the energy storage device 12. The inductor 18 may also be operable to receive charge from the variable capacitor 20 and discharge it to the clamping device 16.

The variable capacitor 20 is configured to change capacitance in response to physical stimulation. The physical stimulation may include vibrations, pressing forces, pulling forces, or the like. For example, the variable capacitor 20 may comprise a pair of conductive plates that are movable relative to one another due to physical forces acting upon one or more of the plates. The plates may move relative to one another so that a distance between the plates changes due to the physical forces. Additionally or alternatively the plates may move relative to one another to effectively change an area of overlap of the plates. In some embodiments, the voltage of the variable capacitor 20 may be clamped, or made substantially constant, when the capacitance of the variable capacitor 20 changes. With the voltage of the variable capacitor 20 held substantially constant when the capacitance changes, charge from the variable capacitor 20 changes in accordance with Equation 1. For example, when the capacitance decreases, the charge of the variable capacitor 20 also decreases due the charge exiting the variable capacitor 20 and traveling through the semiconductor device 22 to, for example, the clamping device 16. The variable capacitor 20 is also operable to receive electric charge from the inductor 18 and to discharge charge to the inductor 18.

$$q = C \times V \quad (1)$$

The semiconductor device 22 is operable to allow electric current to flow from the variable capacitor 20. For example, the semiconductor device 22 may allow electric current to flow from the variable capacitor 20 to the clamping device 16. The semiconductor device 22 may provide a very low resistance path from the variable capacitor 20 to the clamping device 16 when the voltage of the variable capacitor 20 is above the clamping voltage by a certain threshold. In some embodiments, the semiconductor device 22 may comprise a diode or a transistor configured to allow current to flow from the variable capacitor 20 to the clamping device 16.

The transistors 24, 26, 28, 30 are operable to connect the various components of the electrostatic harvester device 10 during the various sequences of operation. For example, transistor 24 may be operable to connect the inductor 18 to the variable capacitor 20. Transistor 26 may be operable to connect the inductor 18 to the energy storage device 12. Transistor 28 may be operable to connect the inductor 18 to ground. Transistor 30 may be configured to connect the clamping device 16 to the inductor 18. The electrostatic harvester device 10 may include any number of transistors, including fewer or more than the number depicted in FIG. 2.

One or more of the transistors 24, 26, 28, 30 comprise gallium nitride and/or aluminum gallium nitride. The inventors have found that using gallium nitride and/or aluminum gallium nitride increases the temperature stability of the electrostatic harvester device 10. The gallium nitride and/or aluminum gallium nitride transistors 24, 26, 28, 30 may have a bandgap that is at least 2 eV. In some embodiments, the transistors 24, 26, 28, 30 may have a bandgap that is at least about 2 eV to about 4.4 eV. Additionally, the transistors 24, 26, 28, 30 may have a parasitic capacitance of at least 9 F to about 10 F. The transistors 24, 26, 28, 30 may have any polarity/logic without departing from the scope of the invention. For example, the transistors 24, 26, 28, 30 may be normally-on so that activation of the transistors 24, 26, 28, 30 occurs when no voltage is applied to their gates resulting in the transistors 24, 26, 28, 30 being in a closed state (or in a state that electrically connects their respective devices).

The inventors have also found that the amount of kinetic energy converted is greatly increased using the gallium nitride and/or aluminum gallium nitride transistors 24, 26, 28, 30 of the present invention. The inventors have found that because the gallium nitride and/or aluminum gallium nitride transistors 24, 26, 28, 30 have higher breakdown electrical fields, such as about 400,000 V/cm to about 800,000 V/cm, the clamping voltage (and therefore the voltage of the variable capacitor 20) can be significantly higher without requiring larger transistors. This enables more of the kinetic energy of the physical stimulation to be converted by the variable capacitor 20 as physical vibrations work against the higher voltage, and therefore higher electric field, of the variable capacitor 20. The harvested energy, $E_V$, has a relationship with the voltage, $V_C$, of the variable capacitor 20 and its change of capacitance, $\Delta C_{VAR}$, according to Equation 2.

$$E_V = 0.5 \Delta C_{VAR} V_C^2 \quad (2)$$

Additionally, completely discharging the clamping capacitor 16 so that its energy is transferred to the energy storage device 12 is often not efficient due to loss from relatively higher current. To avoid the clamping capacitor 16 from reaching the breakdown voltage of prior art transistors, the clamping capacitor 16 had to be partially discharged to the energy storage device 12. The gallium nitride and/or aluminum gallium nitride transistors 24, 26, 28, 30 of the present invention obviate the need to repeatedly partially discharge the clamping capacitor 16 when its voltage is close to the breakdown voltage of the transistors. Instead, the clamping capacitor 16 can be discharged when it has stored enough energy to justify discharging when accounting for the loss associated with complete discharge. This shifts the limiting voltage of the electrostatic harvester device 10 from the transistors 24, 26, 28, 30 to other components, such as, for example, the variable capacitor 20.

The clamping device 16 may clamp a voltage of the variable capacitor 20 and may comprise a capacitor, a battery, a combination of both, and/or another similar energy storage device. The clamping device 16 is operable to provide electric current to the inductor 18 for charging the variable capacitor 20. The clamping device 16 may also be operable to receive charge from the variable capacitor 20 via the semiconductor device 22.

The controller 32 is configured to operate the plurality of transistors 24, 26, 28, 30. The controller 32 may comprise any number or combination of controllers, sensors, circuits, integrated circuits, programmable logic devices such as programmable logic controllers (PLC) or motion programmable logic controllers (MPLC), computers, processors, microcontrollers, transmitters, receivers, amplifiers, other electrical and computing devices, and/or residential or external memory for storing data and other information accessed and/or generated by the electrostatic harvester device 10 and/or the primary device 14.

The capacitance detector 34 is configured to detect the capacitance of the variable capacitor 20. The capacitance detector 34 may be connected to the variable capacitor 20 and the controller 32. The capacitance detector 34 may be configured to send a signal representative of the capacitance of the variable capacitor 20 to the controller 32.

The current detector 36 is configured to detect a current traveling through the inductor 18. The current detector 36 may be connected to the inductor 18 and the controller 32. The current detector 36 may be configured to send a signal representative of the current traveling through the inductor 18 to the controller 32.

The controller 32 may be configured to activate one of the transistors 24 to connect the inductor 18 to the variable capacitor 20 and another transistor 30 when the variable capacitor 20 is at a maximum capacitance so that the inductor 18 and the variable capacitor 20 are connected in series. The capacitance of the variable capacitor 20 may be received from the capacitance detector 34. By activating transistor 24 and transistor 30, the clamping capacitor 16 passes charge to the inductor 18. The controller 32 may be configured to then activate transistor 24 and transistor 28 so that the inductor 18 and the variable capacitor 20 are in series. This causes the inductor 18 to charge the variable capacitor 20. The charging of the variable capacitor 20 may cause the voltage of the variable capacitor 20 to reach about the voltage of the clamping device 16. Physical stimulation may cause the capacitance of the variable capacitor 20 to decrease. As the capacitance is being reduced in the variable capacitor 20, its voltage is increased to a threshold voltage at which point the semiconductor device 22 allows charge to flow from the variable capacitor 20 to the clamping device 16. The current from the variable capacitor 20 to the clamping device 16 charges the clamping device 16.

The controller 32 may be configured receive the capacitance of the variable capacitor 20 from the capacitance detector 34 and determine when the capacitance of the variable capacitor 20 is at a minimum point. The minimum may be achieved when physical stimulation has caused movement of the conductive plates of the capacitor 20 to reduce its capacitance. The controller 32 may be configured to activate transistor 24 and transistor 28 to connect the variable capacitor 20 to the inductor 18 and the inductor 18 to ground so that charge is transferred from the variable capacitor 20 to the inductor 18. The controller 32 may be configured to activate transistor 24 and transistor 30 to connect the inductor 18 to the variable capacitor 20 so that any remaining charge in the variable capacitor 20 is transferred to the inductor 18. The controller 32 may be configured to activate transistor 24 and transistor 30 to transfer the charge of the inductor 18 into the clamping device 16.

The controller 32 may be configured to repeat the above steps after the physical stimulation has caused the variable capacitor 20 to return to its maximum capacity. The controller 32 may be configured to perform—and repeat—these steps in a very small amount of time, such as less than 5 milliseconds. The controller 32 may also be configured to transfer stored charge in the clamping device 16 to the energy storage device 12 by activating transistor 30 and transistor 26, and then transistor 28 and transistor 26 to drain remaining charge in the inductor 18 to the energy storage device 12. The primary device 14 may then receive the converted electrical energy from the energy storage device 12. In some embodiments, the controller 32 is also configured to pre-charge the clamping capacitor 16 from a voltage of about 2.7 V to about 4.2 V to a voltage around the breakdown voltage of the transistors 24, 26, 28, 30.

For example, the semiconductor device 22 may be a transistor controlled by the controller 32. The controller 32 may be configured to open the semiconductor device 22 when the capacitance of the variable capacitor 20 is at a maximum, allow physical stimulation to lower the capacitance of the variable capacitor 20 so that its voltage increases inversely to its capacitance according to Equation 1, and activate transistor 24 and transistor 30 to pre-charge the clamping device 16. After physical stimulation returns the capacitance of the variable capacitor 20 to its minimum, the cycle is repeated with the semiconductor device 22 remaining open until a desired voltage of the clamping device 16 is achieved. The desired voltage is preferably around the breakdown voltage of the transistors 24, 26, 28, 30. The breakdown voltage may differ based on the size/rating of the transistors 24, 26, 28, 30. In some embodiments, the breakdown voltage may be 15 V to about 25 V. In some embodiments, the breakdown voltage may be up to 40 V. In some embodiments, another device may be used to pre-charge the clamping capacitor 16, such as a photovoltaic cell.

Figure 3:
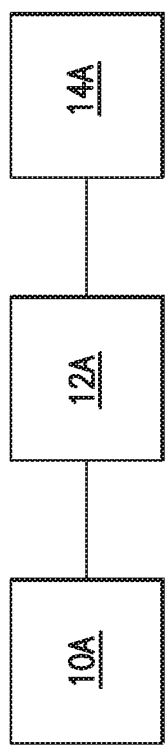
FIG. 3 is a schematic view of a device implementing an electrostatic harvester constructed in accordance with another embodiment of the present invention.
Figure 4:
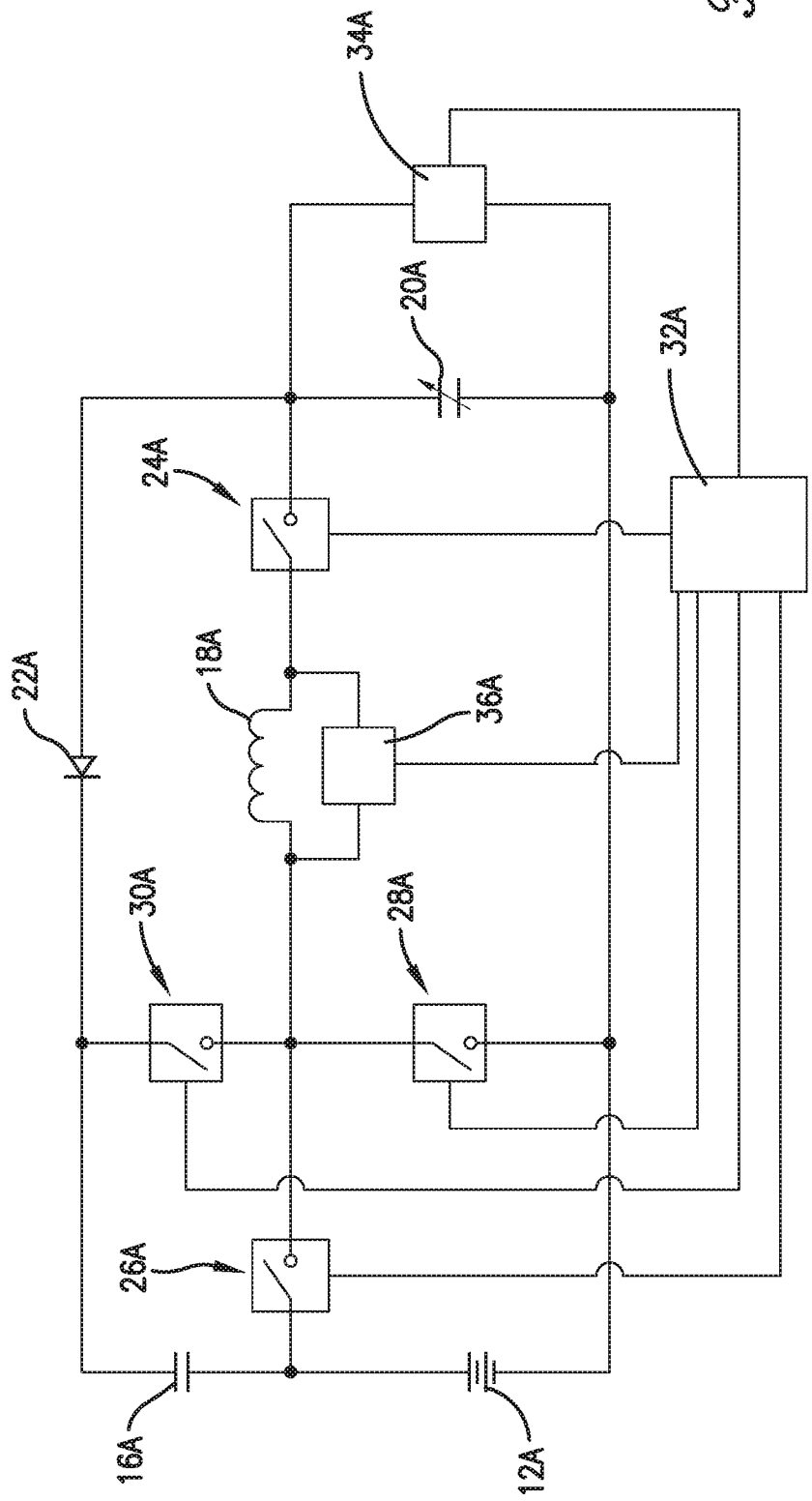
FIG. 4 is a circuit diagram of the electrostatic harvester of FIG. 3.

An electrostatic harvester device 10A constructed in accordance with another embodiment of the invention is shown in FIGS. 3 and 4. The electrostatic harvester device 10A may comprise substantially similar components as electrostatic harvester device 10; thus, the components of electrostatic harvester device 10A that correspond to similar components of electrostatic harvester device 10 have an 'A' appended to their reference numerals.

The electrostatic harvester device 10A includes all the features of electrostatic harvester device 10 except that the clamping device 16A is connected in series with the energy storage device 12A. This configuration reduces the start-up time, or time required to charge the clamping device 16A. Because the clamping device 16A is in series with the energy storage device 12A, the voltage to which the clamping device 16A is to be charged is the difference between the voltage of the variable capacitor 20A and the voltage of the energy storage device 12A.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An electrostatic harvester device for charging an energy storage device, the electrostatic harvester device comprising:
   an inductor operable to receive and store electric charge;
   a variable capacitor device configured to receive electric charge from the inductor and to change capacitance in response to physical stimulation;
   a semiconductor device operable to allow electric current to flow from the variable capacitor device;

a plurality of transistors operable to connect at least two of the following devices: the inductor, the variable capacitor device, or the energy storage device, at least one of the plurality of transistors comprising at least one of gallium nitride or aluminum gallium nitride;

a voltage clamping capacitor configured to receive current from the semiconductor device to maintain the variable capacitor device at a voltage of the voltage clamping device;

a controller configured to operate the plurality of transistors; and a detector configured to capture a signal representing a capacitance of the variable capacitor device and provide the signal to the controller.

2. The electrostatic harvester of claim 1, wherein the at least one of the plurality of transistors is a normally-on transistor.

3. The electrostatic harvester of claim 1, further comprising a current detector configured to capture a signal representing a current traveling through the inductor and provide the signal to the controller.

4. The electrostatic harvester of claim 1, wherein the controller is configured to set a voltage of the clamping capacitor.

5. The electrostatic harvester of claim 4, wherein the voltage of the clamping capacitor is 15 V to about 25 V.

6. The electrostatic harvester of claim 4, wherein the voltage of the clamping capacitor is 20 V to about 40 V.

7. The electrostatic harvester of claim 1, wherein a breakdown electrical field of the at least one of the plurality of transistors is 400,000 V/cm to 800,000 V/cm.

8. The electrostatic harvester of claim 1, wherein a bandgap of the at least one of the plurality of transistors is 2 eV to 4.4 eV.

9. The electrostatic harvester of claim 1, wherein a parasitic capacitance of the at least one of the plurality of transistors is 9 F to 10 F.

10. An electrostatic harvester comprising:

a clamping capacitor;

an inductor operable to receive charge from the clamping capacitor;

a variable capacitor device configured to change capacitance in response to physical stimulation;

a harvesting diode operable to allow electric current to flow from the variable capacitor device to the clamping capacitor;

an energy storage device operable to receive electric charge from the inductor;

a plurality of transistors operable to connect the clamping capacitor, the inductor, and the variable capacitor device, the plurality of transistors comprising at least one of gallium nitride or aluminum gallium nitride;

a controller configured to operate the plurality of transistors;

a detector configured to capture a signal representing a capacitance of the variable capacitor device and provide the signal to the controller; and a current detector configured to capture a signal representing a current traveling through the inductor and provide the signal to the controller.

* * * * *